Sept. 22, 1931. W. J. BROWN 1,824,703
CHEESE CUTTER
Filed April 26, 1930 2 Sheets-Sheet 1
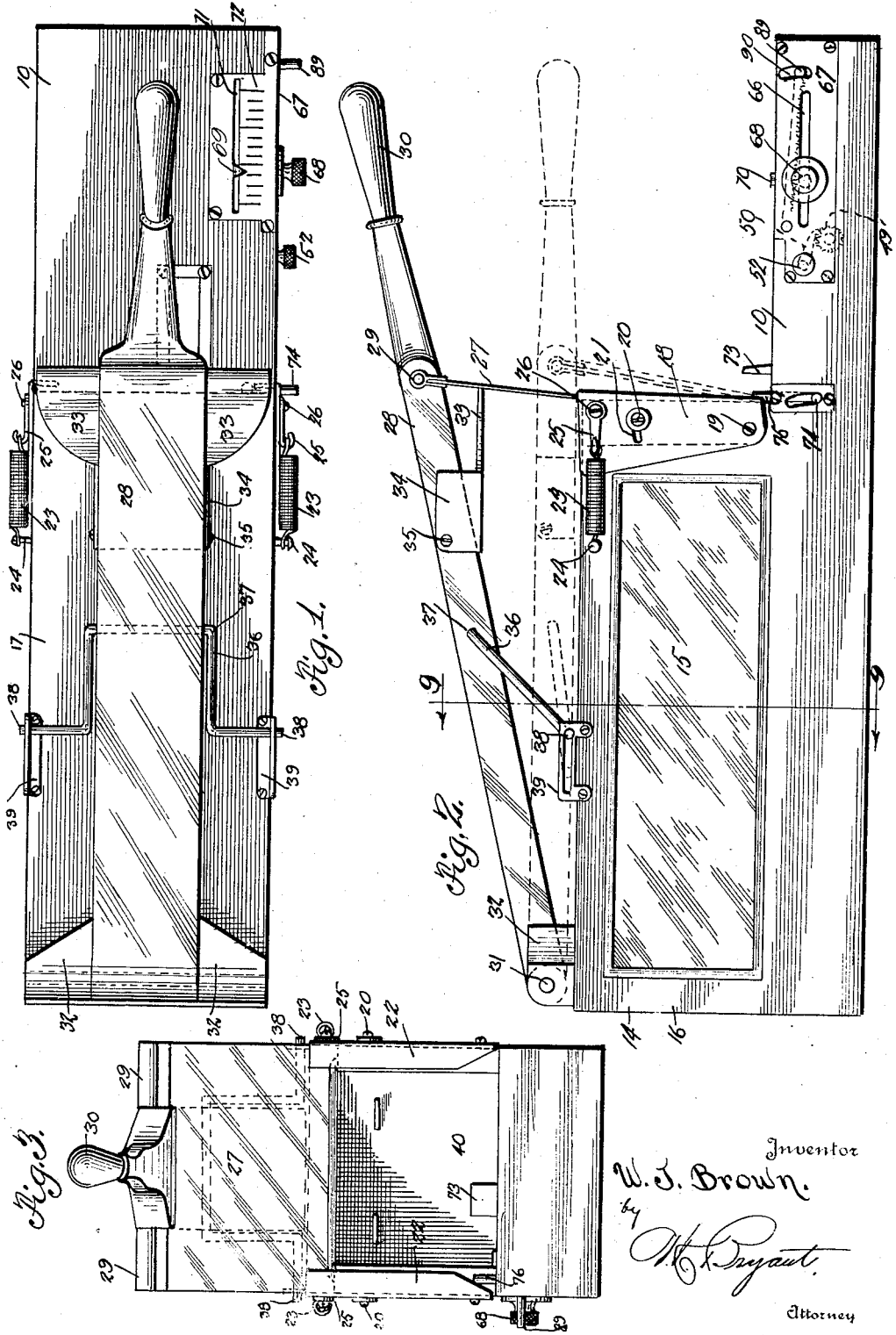

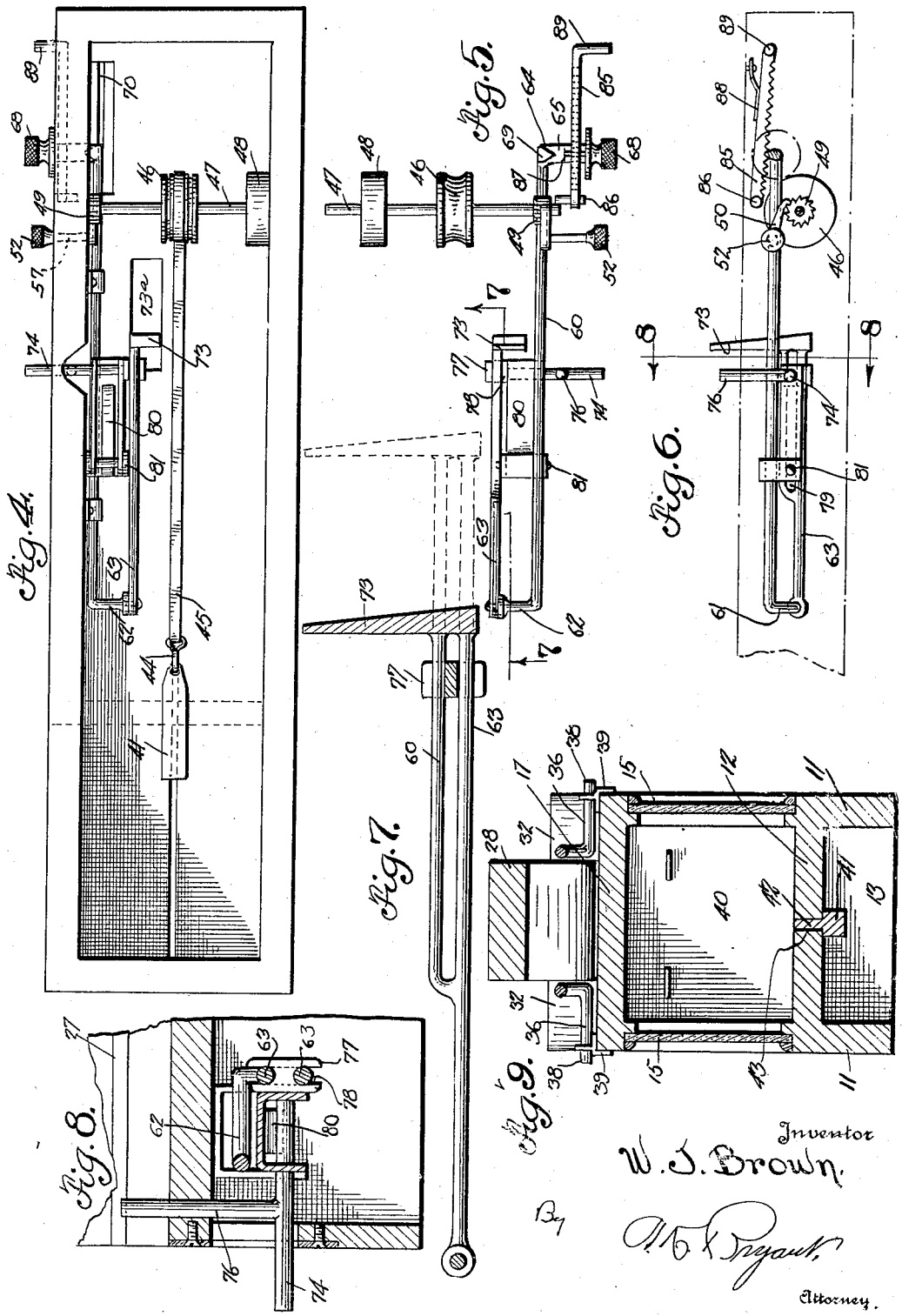

Patented Sept. 22, 1931

1,824,703

UNITED STATES PATENT OFFICE

WILLIAM J. BROWN, OF BUFFALO, KENTUCKY

CHEESE CUTTER

Application filed April 26, 1930. Serial No. 447,642.

This invention relates to improvements in cheese cutters of the type adapted to cut a predetermined slice of cheese of a given weight.

The primary object of the invention, is to provide a device of the above mentioned character in which the block of cheese is fed forward automatically to the cutter whereby the slicing of the cheese may be repeatedly carried out.

A still further object of this invention, is to provide a cheese slicer or dairy product cutter having a stop device for limiting the forward movement of the block of cheese or the like and means controlled by the cutter for releasing the stop whereby the same will be moved out of the path of the cut slice.

A still further object of the invention, is to provide a device of the above mentioned character having means for adjusting the stop device relative to the cutter for accommodating different slice sizes thereby allowing a slice to be cut of any desired thickness or weight.

A still further object of this invention, is to provide a device of the above mentioned character having associated therewith a cutting member which is adapted to sever the cheese into slices as well as to push the same over the stop or limiting device after the limiting device has been moved out of the path of the cut slice.

A still further object of this invention, is to provide upon the limiting stop control device, suitable scale markings which will correspond to the desired slice desired both in thickness and in weight.

A still further object of this invention, is to provide a device of the above mentioned character in which the co-related parts are so associated that a novel device will be produced for cutting desired slices of meat, bread and dairy products.

Other objects of the invention will become apparent during the course of the following description, and in which, Figure 1 is a top elevational view of the invention showing the cutter operating lever and the relation of the food housing to the cutter table;

Figure 2 is a side elevational view of the invention showing the cutting lever, the transparent side walls of the food housing and the adjusting knob for adjusting the stop device into any desired position;

Figure 3 is an end elevational view showing the cutter in its raised position and the spring operated follower slidably mounted in the food housing;

Figure 4 is a bottom plan view showing the mechanism for operating the follower and the associated parts of the stop controlling mechanism;

Figure 5 is a top plan view of the stop controlling mechanism and the spring operated reel for operating the follower;

Figure 6 is a longitudinal side elevational view of the stop mechanism showing the same detached from the cutting device;

Figure 7 is a longitudinal side elevational view of the stop device showing the stop partly in section and showing the same disassembled from the cutting mechanism;

Figure 8 is a cross-sectional view on lines 8—8 of Figure 6 showing the housing partly in section and the knife controlled stop device; and Figure 9 is a transverse cross-sectional view taken on line 9—9 of Figure 2, illustrating the food housing and the transparent side walls and the gripping devices on the spring operated follower.

For the purpose of the illustration of the invention, attention is directed to the drawings, wherein the reference character 10 will generally be employed to designate a base member which comprises side pieces 11, a top 12 and end walls 13. Formed at one end of the base 10 is a food housing 14 having transparent side walls 15 an end wall 16 and a top or cover 17. Associated with the open end of the housing 14 is a pair of guide plates 18 pivoted to the housing 14 as at 19 and guided by screws 20 passing through the guide slots 21 of the guide member 18. Each of the guide plates 18 is provided with a lateral flange secured to the guide plates 18 by a machine screw 26. Each guide plate 18 is adapted to be held toward the housing 14 for guiding a cutter knife 27 carried by a suitable lever 28 on a hinge joint 29. The guide plates 18 also form a closure for the sides of the housing opening for preventing foreign matter entering the casing or housing while the cutter is in its upper position. One end of the lever 28 is formed into a handle 30 while the opposite end is pivoted to the housing 14 by means of a pin 31 passing therethrough and also through a pair of blocks 32 rigidly secured to the top wall 17 of the housing. Mounted on the lever 28 adjacent the transverse knife 27 is a plate 33 having upturned ears 34 for being secured to the hand lever 28 by a screw or the like 35. The plate 33 is adapted to be carried by the transverse knife 27 in order to form a closure for the housing while in its downward travel whereby the material in the housing will be protected from foreign matter. A U-shaped member 36 is adapted to pass through an opening 37 in the lever 28 and has its legs outwardly turned as at 38 for being received in a slotted plate 39 rigidly attached to the side portions of the housing or casing 14. Lateral movement of the operating lever 28 is prevented by the U-shaped member 36 whereby true travel of the cutting blade will always follow within the guide plates 18. As illustrated in dotted lines in Figure 2, the operating lever 28 has been moved downwardly so that the cutting blade 27 has passed over the open end of the housing 14 in such a manner that the upper portion of the cutting blade 27 has moved a distance outwardly of the opening whereby the material slice will have a tendency to move away from the blade and fall upon the platform or base member 10.

The mechanism thus far described constitutes a cutting device of the reciprocating character in which the knife is caused to travel in a vertical and horizontal plane.

Slidably mounted within the housing 14 is a follower 40 having formed on the bottom thereof a lug 41 reduced as at 42 for allowing longitudinal movement in a slot 43 formed in the bottom wall of the housing 12. A hook 44 is connected to one end of the lug 41 and is adapted to connect to a flexible strap 45 which has its opposite end wound around a pulley 46. The pulley 46 is rigidly secured to a cross-shaft 47 which has its opposite ends journalled in the side portions 11 of the base 10, and on one end of the shaft 47 is provided a coil spring 48 in which the inner end is rigidly attached to the shaft 47 and the outer end is secured in a suitable manner to the side wall 11 of the base. A ratchet wheel 49 is rigidly attached to the opposite end of the shaft 47 and is adapted to be engaged by a pawl 50 mounted on the end of a pin 57 which passes through the side wall 11 and is provided with a finger knob 52 for allowing the pawl 50 to move into and out of engagement with the ratchet wheel 49. When it is desired to withdraw or move the follower 40 to the rear of the housing 14, for replenishing the food article to be sliced, the pawl 50 may be employed to hold the shaft 47 against rotation caused by the coil spring 48. In this manner, the tension on the flexible strap 45 is released thereby allowing the insertion and removal of a food product from the housing 14.

Slidably mounted on one of the side walls 11 is a rod 60 having one end bent downwardly as at 61 and outwardly as at 62 to form a bearing for a pivoted rod 63 which is associated with the stop mechanism. The opposite end of the shaft or sliding rod 60 is flat as at 64 and bent outwardly as at 65 to extend through a slot in the side wall 11 which corresponds to a similar slot 66 in a flush plate 67. Any suitable holding means may be attached to the bent end 65 of the sliding rod 60 such as a knurled finger piece 68 whereby movement of the sliding rod 60 may be accomplished. The degree to which the sliding rod 60 is moved is indicated by a pointer 69 which is adapted to extend upwardly through a slot 70 in the top wall of the base 10 and through a corresponding slot 71 in a graduated plate 72. It will be understood that movement of the knurled handle 68 will cause the sliding rod 60 to move the pivoted rod 63 and cause the stop finger 73 to be moved toward or away from the knife 27. The stop member 73 projects through a square opening 73a in the top wall of the base 10 and is adapted to engage the food loaf as it is projected from the open end of the housing 14 by means of the follower 40. A releasing mechanism is operated by the knife 27 and is associated with the stop member 73 by means of a cross pin 74 extending through the side wall 11 of the base 10 and through a slotted plate 75. A continuation of the cross pin 74 is designated at 76 and this extension 76 extends through an opening in the base member 10 adjacent the cutting knife 27 and is adapted to be engaged by the lower edge of the knife for causing downward movement of the stop member 73 out of the path of the sliced article. The cross pin 74 has its inner end flattened at the points 77 and 78 for being received in a slot 79 of the pivoted lever 63 while a leaf spring 80 has one of its ends secured rigidly to the side wall of the casing by means of a pin 81. Tension is placed on the cross pin 74 by the opposite end of the leaf spring 80 in order to hold the extension 76 in its upwardly extended position thereby having a tendency to force the stop foot 73 into the path of the food product to be sliced.

It will readily be understood that after the stop foot 73 has been adjusted by means of the knurled handle 68 and held in adjusted position by the pivoted rack 85, pivoted to the side wall of the base 10 as at 86 and being caused to engage a lip 87 by downward pressure of the leaf spring 88. Thus, the stop 73 is placed in an adjusted position and after the knife 27 has severed a slice from the food product contained in the housing 14, the blade 27 will engage the extension 76 of the cross pin 74 whereby the stop 73 will be moved downwardly out of the path of the severed slice whereby the operation is again repeated for severing as many slices of food product as may be desired. As may be illustrated in Figure 5, the rack bar 85 is provided with an outwardly turned end 89 which extends through an opening in the flush plate 67 designated by the reference character 90.

For consideration of a full description of the operation of the invention, any desired loaf of edible food may be placed in the housing 14 between the open end thereof and the follower 40 whereby the loaf of food product will be caused to move through the opening and stopped by the stop finger 73. The handle 30 is then reciprocated to cause the knife 27 to pass through the food product whereby a slice will be cut from the food product and said slice will be released from gripping action of the stop 73 after the knife 27 has reached the limit of its downward travel and has pressed the extension 76 until the frame is flush with the top wall of the base 10. It will also be noted that the blade 27 moves the sliced food products away from the loaf due to its outward travel while being reciprocated.

For adjusting the stop 73, to any desired degree, the hand piece 89 is raised upwardly to release the rack bar 85 from the lip 87 whereby the knurled handle 68 may be moved so that the indicator 69 registers with the desired thickness in inches as marked on the graduated plate 72. The relative movement between the pivoted lever 63 and the sliding rod 60 causes the stop foot 73 to be moved through the opening 74 whereby the foot 73 limits the outward movement of the food product loaf within the housing 14.

It is to be understood, that various changes may be made in the shape, size and arrangement of parts, without departing from the spirit of the invention or the scope of the sub-joined claims.

Having thus described the invention, what is claimed as new is:—

1. A food cutter of the character described comprising an elongated base, a housing at one end of the base having transparent side walls and an open end wall, a lever pivotally attached to one end of the housing, a transverse cutter knife pivotally attached to the lever, guide plates mounted at the open end of the housing adapted to be moved toward and away from the opening for guiding the reciprocating cutter blade in a vertical and horizontal fashion, means for preventing lateral movement of the reciprocating blade and lever, a stop movably positioned on the base in close relation to the cutter blade, means controlled by the downward movement of the cutter blade for moving the stop below the surface of the base whereby the same will be moved out of the path of the sliced food product, and means for adjusting the stop toward and away from the cutter blade.

2. A food cutter of the character described comprising a base having an elongated cut away portion in the bottom thereof, a housing mounted at one end of the base having transparent side walls and being open at one end, a follower reciprocably mounted in the housing, a lever having one of its ends pivoted to the housing, a handle formed at the other end of the lever for reciprocating the same, means for preventing lateral movement of the reciprocating lever, and a reciprocating knife pivotally attached to the reciprocating lever, a pair of guide plates pivotally attached to each side of the housing adjacent the cutter for guiding the reciprocating knife, a coil spring having one of its ends connected to the housing and its opposite end connected to the guide plate whereby the reciprocating knife will be held in close contact to the open end of the housing, a pivot plate having one end connected to the reciprocating lever and its free end engaging the reciprocating knife, a stop vertically and longitudinally movable in the base in close relation to the reciprocating knife, and means operable upon the full downward movement of the reciprocating knife for causing the stop to be moved below the surface of the top of the base, whereby the sliced food product may move along the top surface of the base.

3. A food cutting machine of the character described comprising an elongated base, a housing at one end of the base having transparent side walls and one of its ends open, a pivoted lever having one end attached to the housing and a handle formed at the other end, a bracket pivoted to the lever and having its opposite ends slidably secured to the housing, a reciprocating knife pivotally attached to the lever, resilient guide plates pivoted adjacent the open end of the housing for guiding the knife in a vertical manner, a stop longitudinally and vertically movable in close relation to the reciprocating knife projecting through the top wall of the base, and means operable by the downward movement of the reciprocating knife for causing said stop to be moved below the surface of the base, said means being encased within the base.

4. A food cutting device of the character described comprising an elongated base having a housing at one end, said housing having transparent side walls and one of its ends open, a follower reciprocably mounted in the housing, a coil spring for causing longitudinal movement of the follower, a reciprocating knife adapted to move over the open end of the housing, a resilient guide plate on each side of the housing opening for guiding the reciprocating knife in a vertical fashion, a stop vertically and longitudinally movable through the top wall of the housing in close relation to the reciprocating knife, means operable by the downward movement of the reciprocating knife for moving the stop downwardly below the surface of the top of the base, said means being encased within the base, and adjusting means for moving the stop toward and away from the reciprocating knife.

In testimony whereof I affix my signature.

WILLIAM J. BROWN.